United States Patent [19]

Velke, Sr. et al.

[11] Patent Number: 4,874,909

[45] Date of Patent: Oct. 17, 1989

[54] ELECTRICAL SPLICE CONNECTOR

[76] Inventors: David C. Velke, Sr., 3305 Aldie Rd., Catharpin, Va. 22018; George P. Marsden, 7621 Mary Cassatt Dr., Potomac, Md. 20854; Burton C. Leffingwell, 242 Meadows Ln., Leesburg, Va. 22075

[21] Appl. No.: 251,370

[22] Filed: Sep. 30, 1988

[51] Int. Cl.⁴ .......... H02G 15/115

[52] U.S. Cl. .......... 174/845; 174/91; 403/229; 439/841

[58] Field of Search .......... 174/845, 91; 439/840, 439/841; 403/214, 229

[56] References Cited

U.S. PATENT DOCUMENTS

| | | | |
|---|---|---|---|
| 242,388 | 5/1881 | Smith | 174/91 |
| 941,276 | 11/1909 | Russell | 439/245 |
| 2,182,896 | 12/1939 | Hixon | 174/91 |
| 2,549,665 | 4/1951 | Conrad | 174/84 S |
| 2,725,545 | 11/1955 | Gordon | 174/91 |
| 2,999,223 | 9/1961 | Peter | 439/724 |
| 3,967,831 | 7/1976 | Chang et al. | 403/229 X |

*Primary Examiner*—Morris H. Nimmo

*Attorney, Agent, or Firm*—Richard C. Litman

[57] ABSTRACT

A connector device for splicing two conductors includes a pair of joined body sections provided with axially offset cable conductor holes leading to an intermediate cavity. A grip element with the cavity, having one or more helical coils has its opposite ends anchored relative to the opposed end faces of the two body sections. Two cable conductors are electrically and mechanically joined by inserting the conductor ends through the body sections and into the cavity, within the confines of the grip element coils following which, twisting of the body sections relative one another constricts the grip element convolutions tightly about the contained conductor ends. The interlock may be further enhanced by the inclusion of a knobbed lock post disposed within the connector cavity and which assists in deforming the conductor ends as the coil grip element is constricted thereabout.

17 Claims, 2 Drawing Sheets

ELECTRICAL SPLICE CONNECTOR

BACKGROUND OF THE INVENTION

This invention relates generally, to electrical connectors and more particularly, to an improved device for joining the ends of two wire conductors by means of a member providing both a positive electrical and physical juncture with but a single twisting action between the two joined elements of the connector.

DESCRIPTION OF THE RELATED ART

Numerous connectors have been provided for obtaining the joining of the ends of two wires or cables. In some instance, the cable conductors are first bared while other known devices include piercing means serving to puncture the cable sheathing and engage the covered conductors. In the latter case, the integrity of both the electrical and physical attachment between the two cables is suspect with the result that such connectors are usually restricted to light-duty use for example, 18 gauge, 120v. twin lead lamp wire as in household use.

The present invention is especially adapted for use in the commercial or industrial fields involving electrical wiring such as multi-strand conductor cables of at least 16 gauge although lighter weight wiring may benefit from the instant device.

The use of a wire coil for attachment means in an electrical fixture is shown in U.S. Pat. No. 941,276 issued Nov. 23, 1909 to Russell and wherein a wire coil of less than a full convolution, serves to receive a lamp plug. The concept of splicing two cable ends within two joined shell members is shown in U.S. pat. No. 2,182,896 issued Dec. 12, 1939 to Hixon. In this instance, the bared ends of conductors are inserted in the opposite ends of rigid common sleeves within the shells. U.S. Pat. No. 2,999,223 issued Sep. 5, 1961 to Peter illustrates the concept of split, twin shells joined by a rigid connector element having offset bores therein which receive the bared ends of conductors. Thereafter, twisting of the shells secures the conductors. There is not found in the above prior art the instant construction including a coil grip element which is constricted about two parallel conductors upon the twisting of two body sections of a unitary connector assembly.

SUMMARY OF THE INVENTION

By the present invention, an improved electrical connector is provided wherein the bared ends of two cables are inserted within the opposite ends of two joined body sections. The inserted conductor ends are thusly disposed in an adjacent, deformable grip element of conductive material comprising at least one full helical coil surrounds the inserted conductor ends and has its opposite ends captively anchored within bores in the respective body sections such that upon angularly displacing or twisting the two body sections relative one another, the coil convolution is constricted or reduced in diameter as it is tightly wound about the two adjacent conductors in a crimping manner.

To further insure a positive, mechanical juncture of the two conductors, an elongated lock post having a plurality of knobs or other enlargements thereon, is supported along the center axis of the connector cavity, intermediate the two conductors, such that upon actuation of the device, an enhanced crimped interlock between the grip element, conductors and lock post is achieved.

Accordingly, one of the objects of the present invention is to provide an improved wiring connector comprising two interlocked components respectfully adapted to receive the endds of two conductors in an overlapping manner and including a circular binding clip therein which, as the two components are twisted relative one another, is constricted about the pair of adjacent conductors to mechanically and electrically interlock the conductors.

Another object of the present invention is to provide an improved wiring connector including an encircling bind clip within a dual-unit body adapted to be wrapped about two inserted wiring conductors and whereafater twisting of the body units relative one another angularly crimps the conductors into a mechanical and electrical interlock condition.

A further object of the present invention is to provide an improved electrical connector including a helically coiled grip element having its ends anchored within a cavity of two joined body units and wherein the coils thereof are constricted about two wire conductors contained therewithin, upon the relative twisting of the two body units.

Still another object of the present invention is to provide an improved cable connector including two joined body members having a cavity therein containing a coil grip element having its ends attached to the respective body members and a central, axial lock post so that upon inserting two conductors through the body members and into the cavity, subsequent twisting of the body members tightly wraps the convolutions of the grip element about the captured conductors and lock post.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawing, in which:

BRIEF DESCRIPTION OF THE DRAWINGS

Similar reference characters designate corresponding parts throughout the several figures of the drawing.

DESCRIPTION OF THE PREFERRED EMBODIMENT

Figure 1:
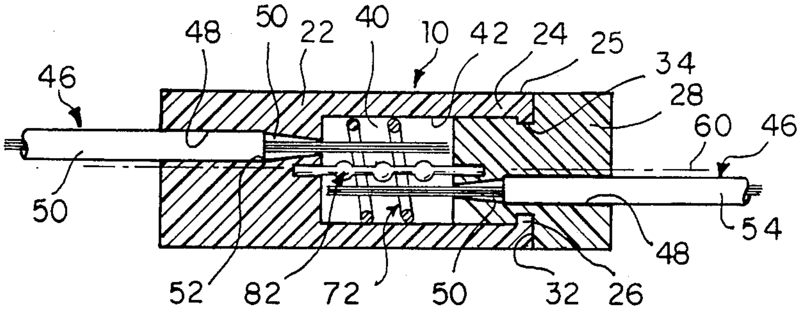
FIG. 1 is a longitudinal sectional view of a connector according to the present invention as it appears immediately prior to its actuation to obtain an interlock of the inserted cable ends.
Figure 2:
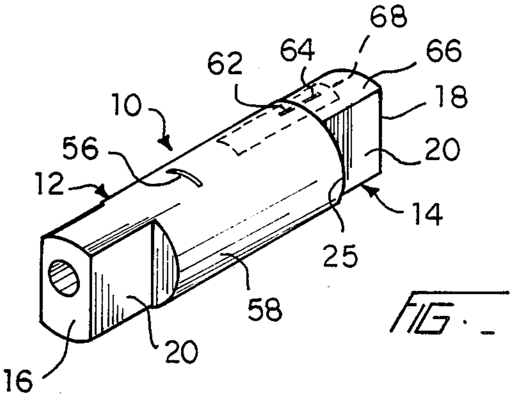
FIG. 2 is a perspecive view of the connector.
Figure 3:
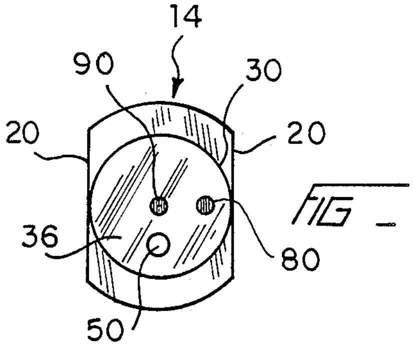
FIG. 3 is an inner end elevation of the male body section of the connector.
Figure 4:
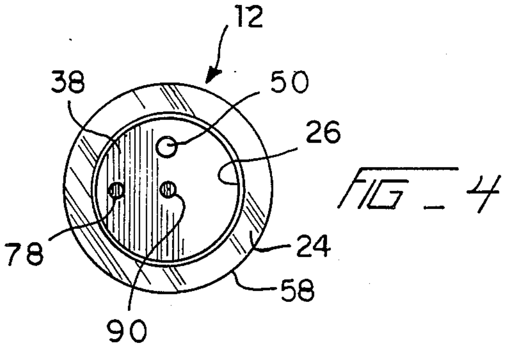
FIG. 4 is an inner end elevation of the female body section of the connector.

Referring now to the drawing, particularly FIGS. 1 and 2, the present invention will be seen to comprise a connector, generally designated 10, including a elongated tubular assembly constructed of susitable dielectric material and formed of two body portions namely, a main body section 12 and an attached secondary body section 14. Each section includes an exposed outer end face 16 or 18 adjacent a peripheral surface comprising two parallel flat surfaces 20—20, the purpose of which will become apparent hereinafter.

As shown most clearly in FIG. 1, the longer main body section 12 includes an end portion 22 having the pair of flat surfaces 20 and which is joined to a tubular sleeve 24 terminating in a forward end 25 having an inturned lip 26. The shorter secondary body section 14 is formed with an end portion 28 having the flat surfaces 20 and which is joined to a reduced diameter inner nose portion 30. The juncture between the end portion 28 and nose portion 30 defines an axially facing shoulder 32 and which communicates with a peripheral groove 34 formed in the material of the nose portion 30.

The inner end face 36 of the secondary body section 14 nd inner end face 38 of the main body section 12 will be seen to be substantially axially spaced apart such than internal cavity 40 having a circular wall 42 is provided within the connector. This cavity, and the adjacent body section end faces 36,38 serve to receive, properly orient and subsequently manipulate, the components which will provide for the positive interlock of bared conductoro endds 44,44 of two cables 46,46.

To receive both the cable sheathing 54 and the conductor ends 44, each body section is provided with a cylindrical cable bore 48, axially communicating with a tapered bore 50 extending through the respective end face 36 or 38. The juncture between each cable bore 48 and conductor bore 50 is defined by a transverse shoulder 52. It will be seen that the bore 48 is a counterbore relative to the tapered bore 50. In this manner, a stripped cable conductor 44 is fed through the cable bore 48 with the distal portion of the conductor thence being guided through the tapered bore 50. Continued advancement of the cable is halted when the cable sheath 54 abuts the bore shoulder 52, at which point the bared conductor 44 will project substantially the axial extent of the cavity 40, as shown in FIG. 1 of the drawing. To facilitate the stripping of the cable ends to insure that the bared conductors 44 are of the proper length to fully span the axial extent of the cavity 40 such as shown in FIG. 1. a stripping guide may be provided on the connector 10 by the inclusion of an appropriate strip guide indicia 56 on the exterior of the main body periphery 58, as indicated in FIG. 2. In this manner, the user may position the end of an unstripped cable along the connector periphery 58 and mark the distance between the indicia 56 and outer face 16 on the cable to reflect the proper length for stripping the cable end.

When the endsd 44,44 of the two cables desired to be spliced are respectively inserted through the two body sections 12,14 and into the intermediate cavity 40, it will be seen from FIG. 1 of the drawing that the ends 44 are disposed 180 degrees from one another, on opposite sides of the center, longitudinal axis 60 of the connector. This dispostion is assured inview of the locataion of the cable bores 48,48 in the two body sections and which ar elikewise offset or eccentric with respect to he center axis 60. The foregoing relative angular position between the two body sections represents their relationship asa the connectoro is assembled by the manufacturer and initially emplyed by the end user. To maintain this relationship, suitable alignable indicia 62,64 may be provided on the body section periphery 58 and secondary body section periphery 66 respectively, to visually identify the foregoing initial angular relationship. A strip or cover tape 68 may be affixed over the thus aligned body sections to retain this alignment until the user is ready to accomplish the actual mechanical and electrical splicing of the two cables. This tape 68 can be of any suitable material such as plasatics or paper and if of the former, may be either opaque or otransparent. If transparent, the tape may be applied over the indicia 62,64 by an adhesive and can be supplied with instructions for use of the connector.

Figure 5:
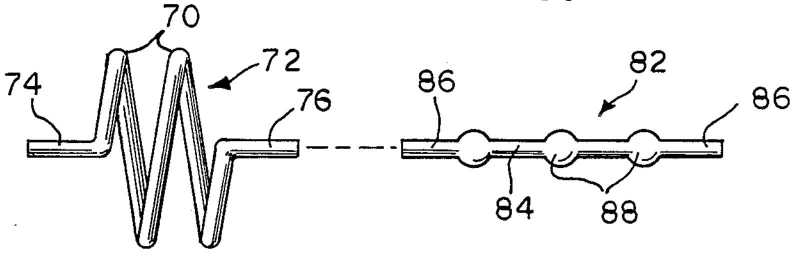
FIG. 5 is an exploded side elevation of the coil grip element and lock post shown within the connector of FIG. 1.

With the bared cable ends, 44,44 disposed within the cavity 40 as depicted in FIG. 1, it will be seen that these ends are surrounded by the coils or convolutions 70 of a coil grip element, generally designated 72. This grip element, shown most clearly in FIG. 5, comprises an integral length of conductive, resilient yet deformable rod or wire stock such as copper and preferably includes at leasat two full helicies or convolutions 70,70. The two ends ofo the unitary grip element are respectively formed as a straight, axially extending first end 74 and similarly disposed second end 76. Although not mandatory, the two endds 74,76 are initially preferably co-axially disposed, as shown inFIGS. 1 and 5 wherein, the grip element will be understood to be in the relaxed condition.

As assembled by the manufacturer, the grip element ends 74,76 are respectively seated within holding means comprising grip end bores 78,80 provided in the end faces 38,36 of the two body sections 12 and 14. As thusly disposed, the grip coils 70,70 will be seen to be immediately juxtaposed the cavity wall 42 and fully surround the two conductor ends 44,44.

With the above construction in mind and the two cable ends disposed as shown inFIGS. 1 and 6, the subsequent operation of the connector may now be described. The user grasps the two body sections 12,14 by engaging the respective pairs of flat surfaces 20,20 between the thumb and forefinger of the left and right hands and twists or angularly displaces the body sections in a counter direction to one another. During this displacement, the inner nose portion 30 of the secondary body section 14 turns within the sleeve 24 of the main body section 12, in view of the close fit therebetween, and produces a concurrent, compound displacement of the conductor ends 44,44 and the coil grip element 72. Initially, the two conductor ends are angularly displaced toward one another and also, the diameter of the grip element helicies 70 are progressively reduced as the grip end bores 78,80 are angularly displaced with respect to one another. After a half turn between the two body sections, the two conductor ends 44,44 will pass each other and continue to be angularly displaced as the diameter of the helicies are further constricted. It will be appreciated that, as the two body sections are further twisted, the grip element performs in the manner of a noose and the continuously tightening coils 70 will soon urge the two conductors into lateral engagement and become tightly wrapped about the engaged conductors to provide an interlock between the conductor ends and grip element. With the construction shown, it has been found that two full turns between the connector body sections will cause the grip element coils to be adequately constricted to form the desired positive interlock such as reflected in FIG. 7 of the drawing.

Figure 6:
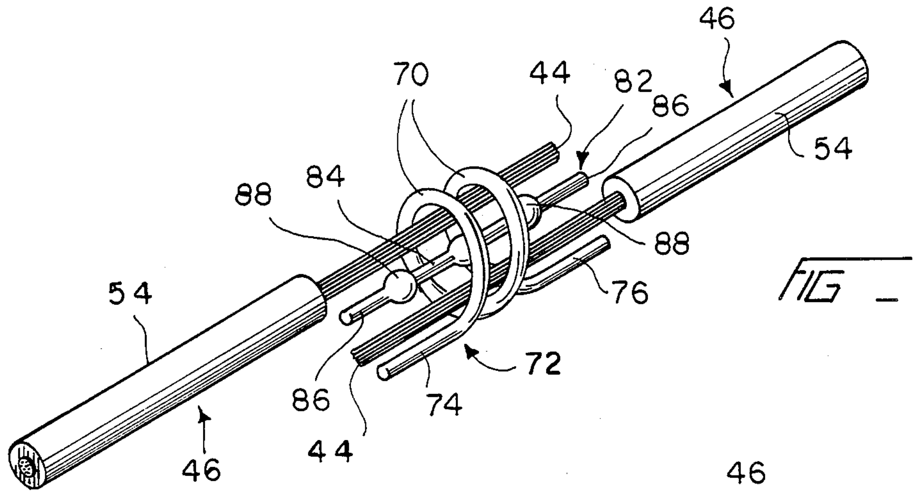
FIG. 6 is a perspective view of the components within the connector cavity as they appear prior to actuation of the body sections.
Figure 7:
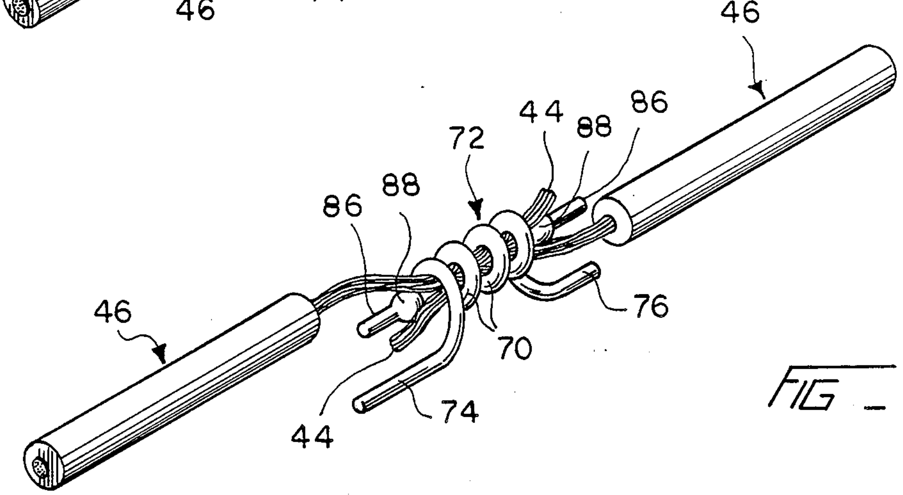
FIG. 7 is a view similar to FIG. 6 but of the components as they appear following actuation of the connector to interlock the cable conductors.

FIGS. 1,6 and 7 will be seen to illustrate the inclusion of an additional component associated with the spliced joint nas provided with the present connector 10. The interlock between the spliced cable ends 44,44 may be enhanced by the inclusion of a lock post 82 particularly when the cable conductors comprise a solid wire but will be understood to also insure a more positive mechanical juncture when using stranded cable conductors such as shown in the drawing. This lock post 82 comprises a unitary, longitudinal member having an axial shank 84 provided with opposite ends 86,86 and a plurality of intermediate, spaced apart knobs or enlargements 88 thereon. These enlargements may comprise spherical bodies or any other suitable configuration which will serve to provide radial abutments intended to discourage pulling apart of the two connected cables 46,46. This enhanced juncture will be apparent in view of the resultant crimping of the conductor ends 44,44 as they are forced into engagement with the lock post shank 84 intermediate the enlargements 88, by the constricted convolutions 70 of the tightened grip element 72. Th elock post ends 86,86 will be seen to be inserted within holes 90,90 in the respective body section end faces 36,38 which are coaxial with the connector center axis 60.

The thus completed splicing operation results in a most positive electrical as well as mechanical union of the two cables 46,46 and it matters not whether the two body sections 12,14 were twisted so far as to withdraw the ends 74,76 from the respective body section bores 78,80, during the constriction of the grip element coils 70 since both the grip element as well as the lock post have become a part of the firmly interlocked cable ends, wtihin the confines of the connector cavity 40. The body sections of the connector have done their job at this stage and remain about the interlocked cables to provide an insulative isolation of the spliced joint.

The connector as above described may be utilized with any suitable well known type of shielding device as required to comply with electrical codes and which would surround the connector to provide protection, both against weather and mechanical abuse.

We claim:

1. A cable connector for uniting the bared ends of conductors of two cables comprising;

main and secondary body sections each having a conductor hole therethrough, said body sections disposed in axial alignment and having inner end faces spaced apart to define a cavity therebetween, means joining said body sections together to allow angular displacement therebetween, a grip element within said cavity and having at least one coil terminating in first and second ends, said body section inner end faces each having holding means thereon angularly offset from said conductor holes and receiving and retaining said grip element ends whereby, following insertion of two cable conductor ends through said conductor holes and into said cavity within the confines of said grip element coil and subsequently twisting said body sections relative one another, said grip element coil is constricted in a crimped manner about the two conductor ends thereby electrically and mechanically interlocking the conductor ends.

2. A cable connector according to claim 1 wherein, said body sections each include an external periphery joined to an outer end face, and a pair of flat surfaces on said body section external peripheries adjacent said outer end faces, whereby a user may grasp each said pair of flat surfaces to facilitate the twisting of said body sections.

3. A cable connector according to claim 1 wherein, said conductor holes are axially disposed through said body sections, and the axes of said conductor holes are offset from the center axis of said body sections.

4. A cable connector according to claim 1 wherein, said grip element includes at leasat two helical coils.

5. A cable connector according to claim 1 wherein, said body sections are of dielectric material.

6. A cable connectoro according to claim 1 wherein, said grip element is of a deformable conductive material.

7. A cable connectoro according to claim 1 including, a lock post within said cavity, said lock post including a longitudinal shank having opposite ends, and means on said main and secondary body section inner end faces engageable with said lock post ends to support said lock post within the confines of said grip element coil.

8. A cable connector according to claim 1 wherein, said main body section includes a sleeve defining said cavity and terminating in a forward end., 9. A cable connector according to claim 1 including, guide means on one said body section adapted to indicate the proper length of stripped cable conductors to be inserted within said body sections.

10. A cable connector according to claim 1 wherein, said grip element ends are axially disposed, and said holding means includes axially extending bores through said inner end faces of said body sections.

11. A cable connector according to claim 3 wherein, said body sections each include an outer end face, said conductor holes each comprising a counterbore adjacent said outer end faces joined to a smaller diameter bore adjacent said inner end faces and providing a shoulder therebetween, whereby the sheath of a bared sheathed cable abuts said shoulder upon the insertion of the conductor thereof into said conductor holes.

12. A cable connector according to claim 4 wherein, the diameter of said coils is substantially equal to the diameter of said cavity.

13. A cable connector according to claim 7 wherein, said lock post is of conductive material.

14. A cable cononector according to claim 7 including, at least one enlargement on said shank intermediate said opposite ends.

15. A cable connector according to claim 7 wherein, said means on said main and secondary body section inner end faces includes a hole therein.

16. A cable connector according to claim 8 wherein, said means joining said body sections together includes an inturned lip on said sleeve forward end engageable within a groove in said secondary body section.

17. A cable connector according to claim 14 wherein, said enlargement defines a spherical configuration.

* * * * *